(12) United States Patent
Rogers

(10) Patent No.: US 8,187,369 B2
(45) Date of Patent: May 29, 2012

(54) SORBENT ACTIVATION PLATE

(75) Inventor: Bradley S Rogers, Leawood, KS (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 12/562,518

(22) Filed: Sep. 18, 2009

(65) Prior Publication Data

US 2011/0067572 A1    Mar. 24, 2011

(51) Int. Cl.
*B01D 53/02* (2006.01)
(52) U.S. Cl. ............... 96/146; 96/147; 428/99; 428/141
(58) Field of Classification Search .............. 96/146, 96/147; 428/99, 141
See application file for complete search history.

(56) References Cited

U.S. PATENT DOCUMENTS

| | | | | |
|---|---|---|---|---|
| 2,313,933 | A * | 3/1943 | Goerg ..................... 126/307 A |
| 2,946,510 | A * | 7/1960 | Galvin ......................... 237/70 |
| 4,891,052 | A * | 1/1990 | Belin et al. ..................... 55/429 |
| 5,050,582 | A * | 9/1991 | Almond et al. ............. 126/374.1 |
| 5,064,621 | A * | 11/1991 | Uyama et al. ................ 422/144 |
| 5,343,830 | A * | 9/1994 | Alexander et al. ............ 122/4 D |
| 5,809,940 | A * | 9/1998 | James et al. .................. 122/4 D |
| 6,006,741 | A * | 12/1999 | Daddis, Jr. ................ 126/110 R |
| 6,095,095 | A * | 8/2000 | Alexander et al. .............. 122/34 |
| 6,237,344 | B1 * | 5/2001 | Lee ................................ 60/754 |
| 6,264,905 | B1 * | 7/2001 | Spokoyny .................... 423/237 |
| 6,454,824 | B1 * | 9/2002 | Maryamchik et al. ....... 55/434.4 |
| 7,687,044 | B2 * | 3/2010 | Keefer et al. ................. 422/211 |
| 2004/0065013 | A1 * | 4/2004 | DeVries ...................... 48/198.2 |
| 2008/0134577 | A1 * | 6/2008 | DeVries ........................... 48/61 |
| 2009/0056741 | A1 * | 3/2009 | Iida et al. ......................... 134/1 |

OTHER PUBLICATIONS

China Jewelry Factory: Fashion Belt from http://www.chinajewelryfactory.com/western-belt-buckle.htm, archived from Feb. 17, 2008.*

* cited by examiner

*Primary Examiner* — Robert J Hill, Jr.
*Assistant Examiner* — Christopher P Jones
(74) *Attorney, Agent, or Firm* — Sutherland Asbill & Brennan LLP

(57) ABSTRACT

A sorbent activation plate having a first surface, a second surface opposite the first surface, a plurality of reliefs in the first surface, and a plurality of protrusions on the second surface. The sorbent activation plate is structured to attach to a boiler tube such that the plurality of protrusions contact the boiler tube and offset the second surface from the boiler tube.

16 Claims, 4 Drawing Sheets

SORBENT ACTIVATION PLATE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is generally in the field of emission control devices. More particularly, the present invention is directed to a device and method of activating sorbent using sorbent activation plates placed in the flue gas flow path.

Sorbents are widely used in power generation systems such as coal-burning power plants to neutralize or capture various combustion by-products. Examples of such sorbents include activated carbon, silica, calcium hydroxide, and sodium bicarbonate. The selection of a sorbent for a particular application is dictated by the type of by-product which is to be captured or eliminated. For example, activated carbon is often used to capture mercury. Calcium hydroxide and sodium bicarbonate are often used to neutralize sulfur dioxide and/or NOx emissions.

Conventionally, sorbents are injected into the combustor or into the flue gas flow path downstream of the combustor. The sorbent is then allowed to mix and/or react with the combustion by-products before the combustion by-products are exhausted to the atmosphere. The sorbent is typically reclaimed from the exhaust flow by filtration or other separation process.

Sorbent utilization increases operating costs both because of the cost of providing the sorbent and the costs of separating and/or disposing the sorbent from the flue gas flow path. As such, it would be desirable to provide a device and method to improve the efficiency of sorbent utilization.

BRIEF SUMMARY OF THE INVENTION

In one aspect, the present invention comprises a sorbent activation plate. The sorbent activation plate has a first surface, a second surface opposite the first surface, a plurality of reliefs in the first surface, and a plurality of protrusions on the second surface. The sorbent activation plate is structured to attach to a boiler tube such that the plurality of protrusions contact the boiler tube and offset the second surface from the boiler tube.

In another aspect, the present invention comprises a system for improving sorbent effectiveness comprising a boiler tube and a sorbent activation plate attached to the boiler tube. The sorbent activation plate comprises a body having a first surface facing the boiler tube, a second surface facing away from the boiler tube, and a plurality of reliefs in the second surface.

In yet another aspect, the present invention comprises a system for improving sorbent effectiveness comprising a housing providing a flow path for a flue gas, and a sorbent activation plate provided in the housing. The sorbent activation plate comprises a body having a first surface and a plurality of reliefs or channels in the first surface. The sorbent activation plate is attached within the housing such that the first surface lies in the flow path of the flue gas.

DETAILED DESCRIPTION OF THE INVENTION

Sorbent effectiveness—a sorbent's ability to adsorb or react with a component to be separated from a flue gas—is primarily dictated by the adsorption or reaction kinetics of the component and the sorbent. Residence time, temperature, pressure, and component and sorbent concentrations are among the many factors affecting the amount of the component that can be removed from the flue gas by a specific amount of a particular type of sorbent.

In one aspect, the present invention comprises a sorbent activation plate which improves the residence time and/or temperature conditions under which the sorbent and component combine, react or adsorb.

Figure 1:
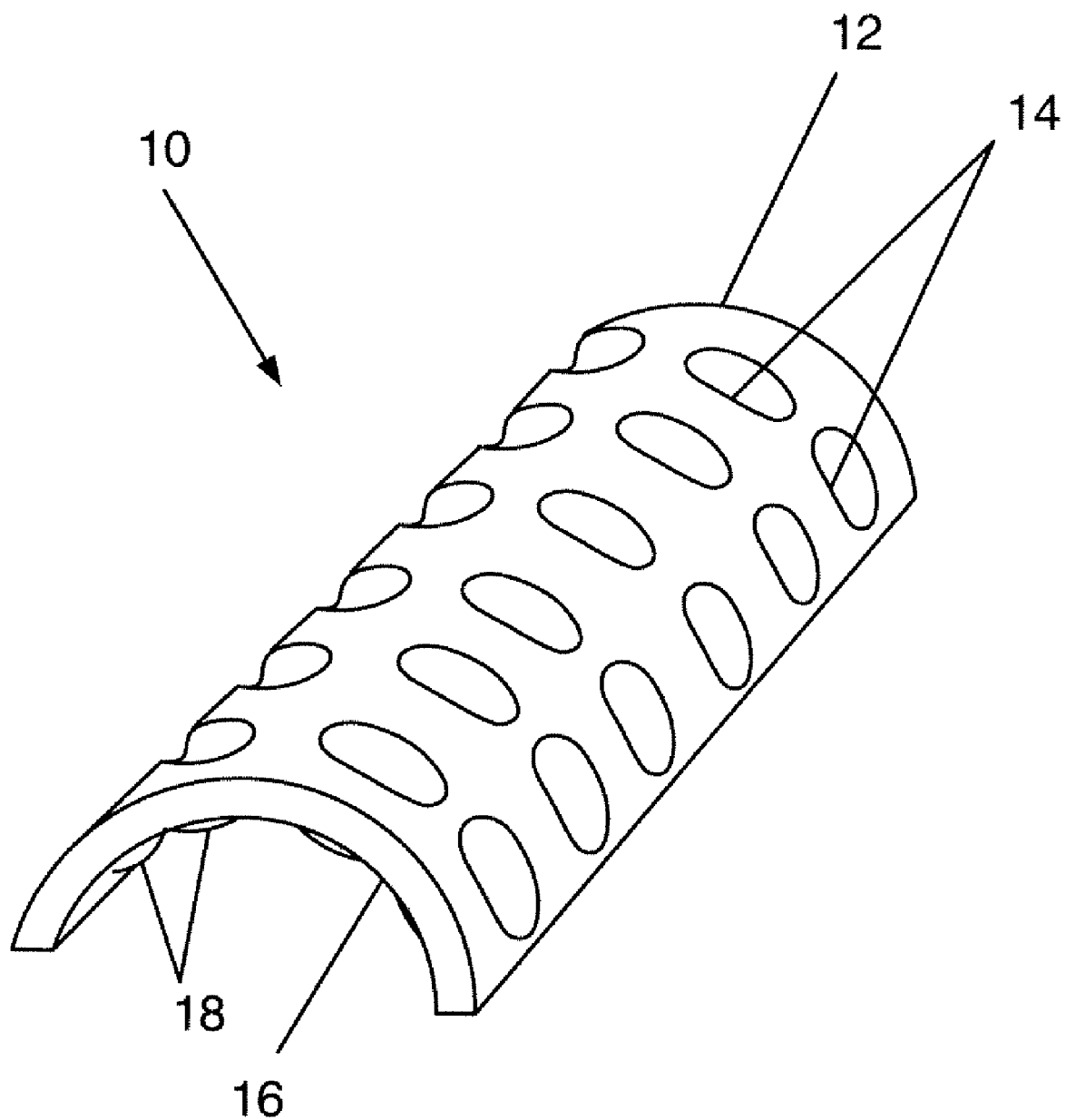
FIG. 1 is a perspective view, illustrating a sorbent activation plate.

One embodiment of the present invention is illustrated in FIG. 1. The sorbent activation plate 10 includes a body 11 with an outer surface 12 and an inner surface 16. The outer surface 12 may be generally formed into the shape of an exterior cylindrical surface. The inner surface 12 may be generally formed into the shape of an interior cylindrical surface. The width of body 11 between the outer surface 12 and the interior surface 16 may be uniform throughout the sorbent activation plate 10. The outer surface 12 may have a plurality of reliefs 14 formed therein. Each of the reliefs 14 may be formed to have a corresponding protrusion 18 on the inner surface 16 opposite the relief.

Although embodiments of the sorbent activation plate 10 may be made of various materials and manufactured according to various methods, it is preferred for the sorbent activation plate 10 to be manufactured of materials capable of withstanding flue gas temperatures. For example, the sorbent activation plate 10 may be made of various materials including but not limited to stainless steel, aluminum, or ceramic.

In some embodiments, the reliefs 14 may be formed in the shape of concave dimples as illustrated in FIG. 1. The protrusions 18 may be formed in the shape of convex bumps. The body 11 of these embodiments may be formed by various manufacturing processes including, but not limited to, casting, molding, extrusion and/or stamping processes.

Figure 2:
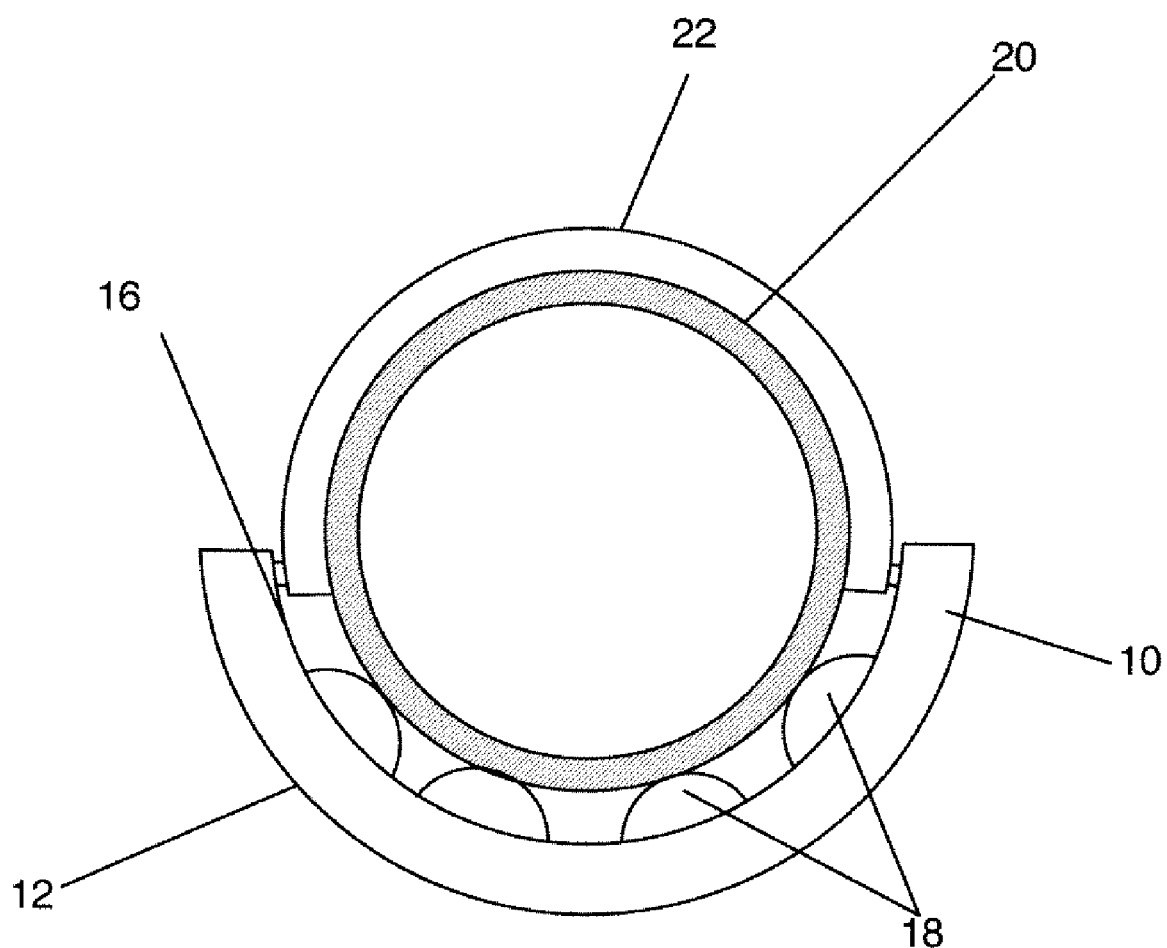
FIG. 2 is a side view, illustrating a sorbent activation plate attached to a boiler tube in accordance with an embodiment of this invention.

In another aspect, the present invention comprises a system for improving the effectiveness a sorbent. In one embodiment, the sorbent activation plate 10 is attached to a boiler tube 20 as illustrated in FIG. 2. The sorbent activation plate 10 is attached to the boiler tube 20 with an attachment clip 22 such that the outer surface 12 of the sorbent activation plate 10 is exposed to the flue gas flow path. The protrusions 18 may be configured to act as stand-offs, separating the cylindrical portion of the inner surface 16 from the boiler tube 20. The sorbent activation plate 10 may be fastened to the attachment clip by welding or with the use of a fastener.

Figure 3:
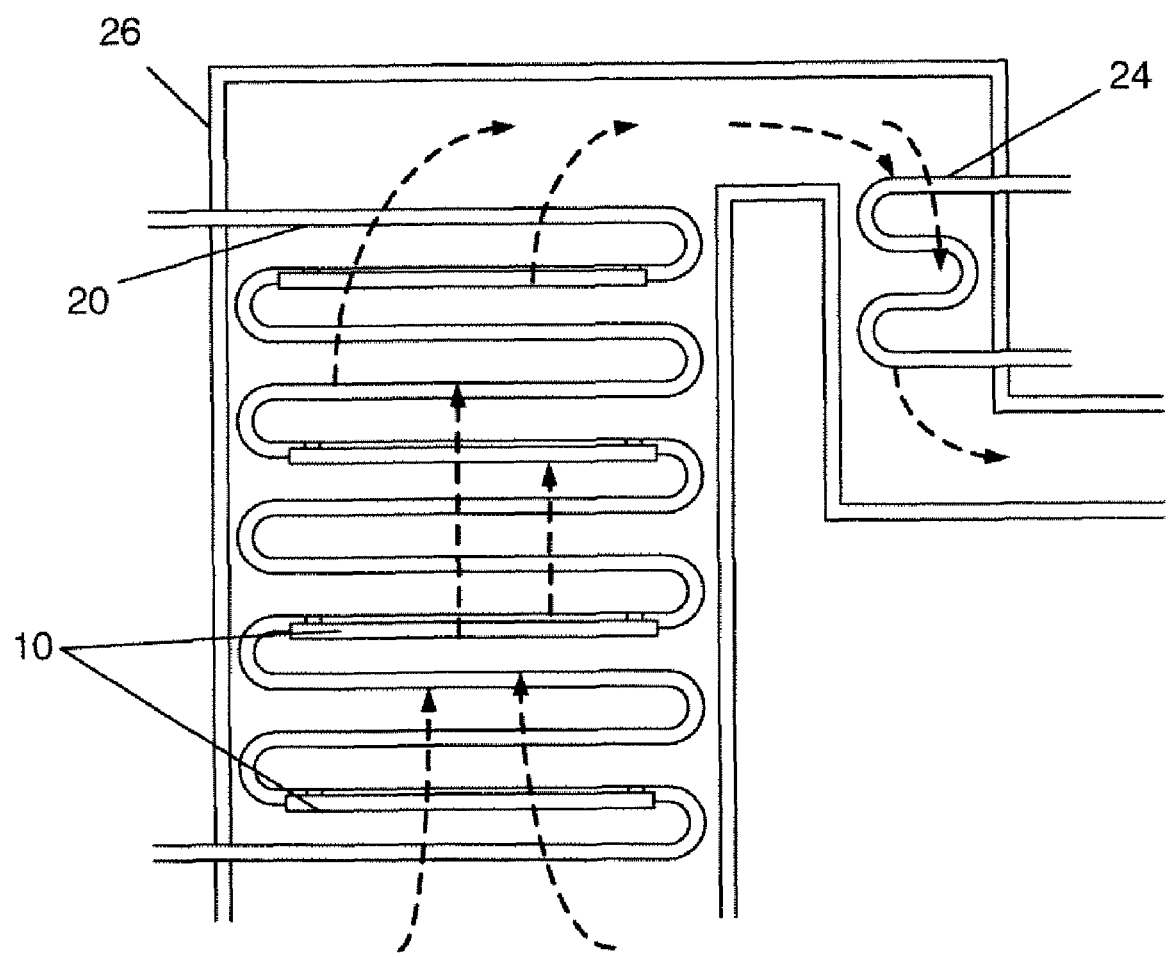
FIG. 3 is a plan view, illustrating sorbent activation plates employed in a boiler in accordance with an embodiment of this invention.

In some embodiments, a plurality of sorbent activation plates 10 are attached at multiple locations in a boiler housing 26 as illustrated in FIG. 3. In the embodiment of FIG. 3, the boiler housing 26 has an entrance boiler tube 20 and an exit boiler tube 24. The boiler tubes 20 and 24 carry fluids which are heated in the boiler housing 26 by the flow of hot flue gases, illustrated as arrows in FIG. 3. In some embodiments, the sorbent activation plates 10 are attached to the boiler tube 20 at a plurality of locations.

Because the protrusions 18 separate the inner surface 16 of from the boiler tube 20, the sorbent activation plate 10 is able to operate at higher temperatures than the boiler tube 20. Also, the reliefs 12 may be positioned to face the flow path of the flue gas so that injected sorbent collects or is deposited on the sorbent activation plate 10. This increases the average residence time in which the sorbent particles are present in the boiler housing 26, and, thus, increases the time the sorbent particles are exposed to the flue gas. In embodiments in which the sorbent activation plates 10 are attached to the boiler tubes 20 and/or 24, collection of the sorbent particles on the boiler tubes 20 and 24 is also reduced.

Because the boiler tubes 20 and 24 carry a fluid that is cooler than the flue gases, the sorbent particles are normally cooled when they contact the boiler tubes 20 and 24. In most cases, this cooling reduces the effectiveness of the sorbent and can lead to build up of the sorbent on the boiler tubes. As such, it should be appreciated that the attachment of the sorbent activation plates 10 to the boiler tubes 20 may generally result in increased average sorbent residence times and increased average sorbent temperatures. Both of these features increase sorbent effectiveness and allow for less sorbent utilization.

Figure 4:
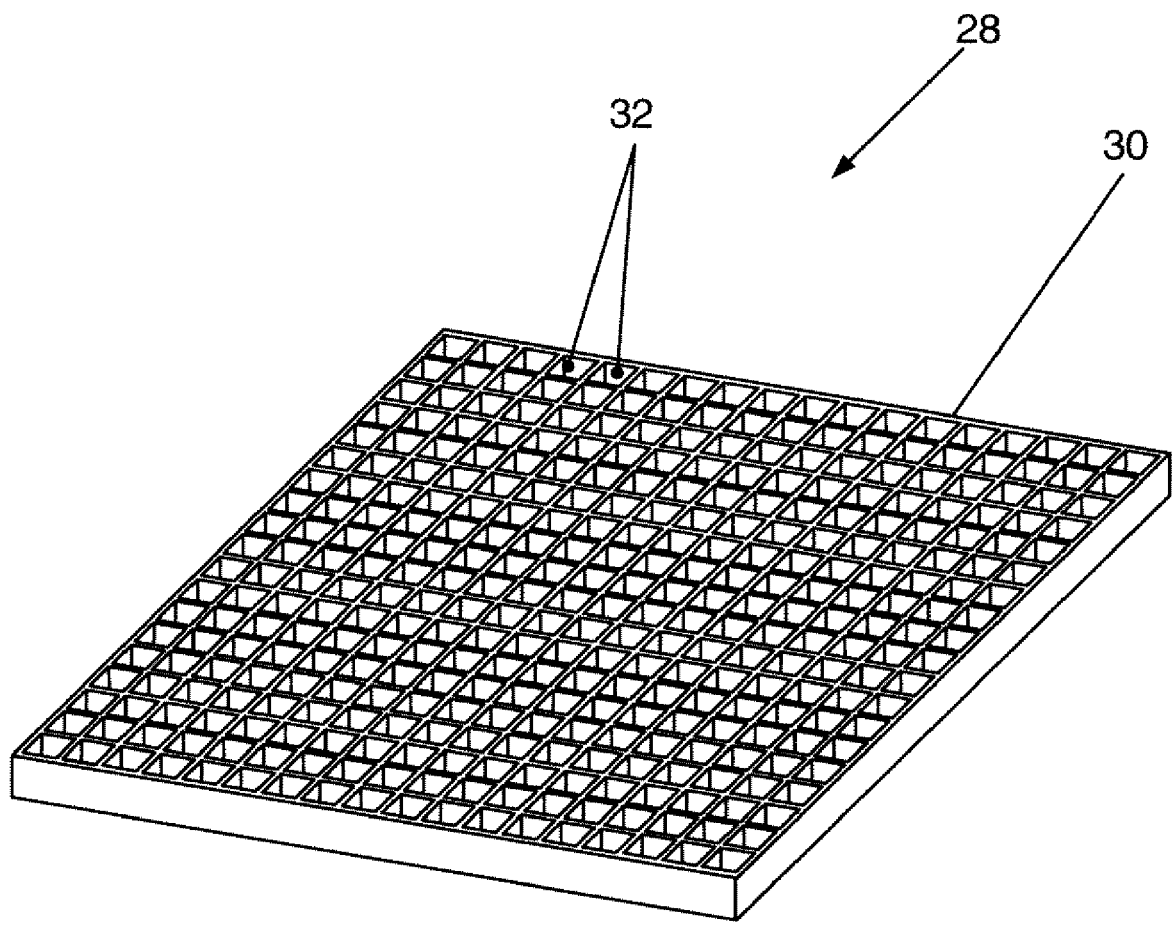
FIG. 4 is a perspective view, illustrating a sorbent activation plate in accordance with an embodiment of this invention.

It should be appreciated that many different designs may be employed for the sorbent activation plates. Another embodiment is illustrated in FIG. 4. In this embodiment, a sorbent activation plate 28 includes a surface 30 which faces the flue gas flow and a plurality of channels 32 which allow the flue gases to pass therethrough. Similar to the embodiment of FIG. 1, sorbent particles are deposited on surface 30 when the flue gas flows through channels 32. Sorbent activation plate 28 may be placed in various locations along the flue gas flow path. For example, multiple sorbent activation plates 28 may be placed at the inlet of a boiler or at various locations in the boiler housing 26 of FIG. 3.

The sorbent activation plate 28 may be manufactured of various materials. In some embodiments, the sorbent activation plate 28 comprises expanded metal, grating, or any other surface structured to allow a sorbent in the flue gas to deposit thereon.

Modifications and variations of the devices and systems described herein will be obvious to those skilled in the art from the foregoing detailed description. Such modifications and variations are intended to come within the scope of the appended claims.

What is claimed is:

1. A sorbent activation plate comprising: a body comprising: a first surface; a second surface opposite the first surface; a plurality of reliefs in the first surface; and a plurality of protrusions on the second surface, wherein said second surface of the sorbent activation plate is attached to a boiler tube such that the plurality of protrusions contact the boiler tube and offset the second surface from the boiler tube, wherein the first surface faces away from the boiler tube, and wherein each of the plurality of reliefs comprises a concave dimple.

2. The sorbent activation plate of claim 1, wherein each of the plurality of protrusions comprises a convex bump.

3. The sorbent activation plate of claim 1, wherein the first surface comprises a portion of a cylindrical surface.

4. The sorbent activation plate of claim 1, further comprising an attachment clip adapted to attach the body to the boiler tube.

5. A system for improving sorbent effectiveness comprising:
a boiler tube; and
a sorbent activation plate attached to the boiler tube, the sorbent activation plate comprising a body having a first surface facing the boiler tube, a second surface facing away from the boiler tube, and a plurality of reliefs in the second surface,
wherein each of the plurality of reliefs comprises a concave dimple.

6. The system of claim 5, wherein the sorbent activation plate further comprises a plurality of protrusions on the first surface, wherein said sorbent activation plate is structured to attach to the boiler tube such that the plurality of protrusions contact the boiler tube and offset the second surface from the boiler tube.

7. The system of claim 6, wherein each of the plurality of protrusions comprises a convex bump.

8. The system of claim 5 wherein the second surface comprises a portion of a cylindrical surface.

9. The system of claim 5, further comprising an attachment clip adapted to attach the sorbent activation plate to the boiler tube.

10. A system for improving sorbent effectiveness comprising:
a housing providing a flow path for a flue gas;
a boiler tube disposed within the housing; and
a sorbent activation plate provided in the housing and attached to the boiler tube, the sorbent activation plate comprising a body having a first surface facing away from the boiler plate and a plurality of reliefs or channels in the first surface;
wherein the sorbent activation plate is attached within the housing such that the first surface lies in the flow path of the flue gas,
wherein each of the plurality of reliefs or channels comprise a concave dimple.

11. The system of claim 10, the sorbent activation plate further comprising a second surface opposite the first surface and a plurality of protrusions on the second surface; wherein said sorbent activation plate is attached to a boiler tube such that the plurality of protrusions contact the boiler tube and offset the second surface from the boiler tube.

12. The system of claim 11, wherein each of the plurality of protrusions comprises a convex bump.

13. The system of claim 10, wherein the first surface comprises a portion of a cylindrical surface.

14. The system of claim 10, further comprising an attachment clip adapted to attach the sorbent activation plate to the boiler tube.

15. The system of claim 10, wherein the sorbent activation plate comprises expanded metal or grating.

16. The system of claim 10, wherein the first surface is structured to allow a sorbent in the flue gas to deposit thereon.

\* \* \* \* \*